United States Patent [19]

Sadot et al.

[11] Patent Number: 5,313,497
[45] Date of Patent: May 17, 1994

[54] METHOD OF DETECTING A DISTURBING SIGNAL FOR A DIGITAL DATA DEMODULATOR, AND APPARATUS IMPLEMENTING SUCH A METHOD

[75] Inventors: Philippe Sadot, Paris; Bertrand Thebault, Asnieres; Marc Darmon, Paris; Jacques Eudes, Mesnil le Roi, all of France

[73] Assignee: Alcatel Telspace, Nanterre Cedex, France

[21] Appl. No.: 828,176

[22] Filed: Jan. 30, 1992

[30] Foreign Application Priority Data

Jan. 31, 1991 [FR] France .................. 91 01078

[51] Int. Cl.⁵ ........................................ H04B 1/10
[52] U.S. Cl. .................................. 375/99; 375/96
[58] Field of Search ................. 375/10, 11, 94, 99, 375/102, 96; 328/162, 165; 455/296

[56] References Cited

U.S. PATENT DOCUMENTS

| 4,370,740 | 1/1983 | Levy et al. | 328/162 |
| 4,799,025 | 1/1989 | Le Quean | 375/96 |
| 4,984,253 | 1/1991 | Trout | 375/99 |
| 5,153,527 | 10/1992 | Yaguchi | 375/99 |

FOREIGN PATENT DOCUMENTS

WO8504999 11/1985 PCT Int'l Appl. .......... H04L 25/08

*Primary Examiner*—Stephen Chin
*Attorney, Agent, or Firm*—Sughrue, Mion, Zinn, Macpeak & Seas

[57] ABSTRACT

A method of detecting a disturbing signal for demodulating digital data, wherein, on the modulated signal transposed into baseband, the disturbing signal is detected by periodically inserting known signals by means of a fixed guard time delay $((R+I)T_s)$ applied to the received signal prior to demodulation, and wherein said method includes: a step of estimating the square of the modulus of the cross-correlation of the received referenced signal and of the expected signal at a determined instant when the reference signal is assumed to be present; a step of estimating the square of the correlation of the received signal at the same instant, of multiplying by a coefficient which represents the square of the threshold for the estimated correlation coefficient, and of multiplying by the number of reference symbols used in a reference burst; and a step of comparing with each other the two quantities obtained simultaneously during the preceding two steps. The invention also relates to apparatus for implementing the method. The invention is particularly applicable to digital radio beams.

7 Claims, 1 Drawing Sheet

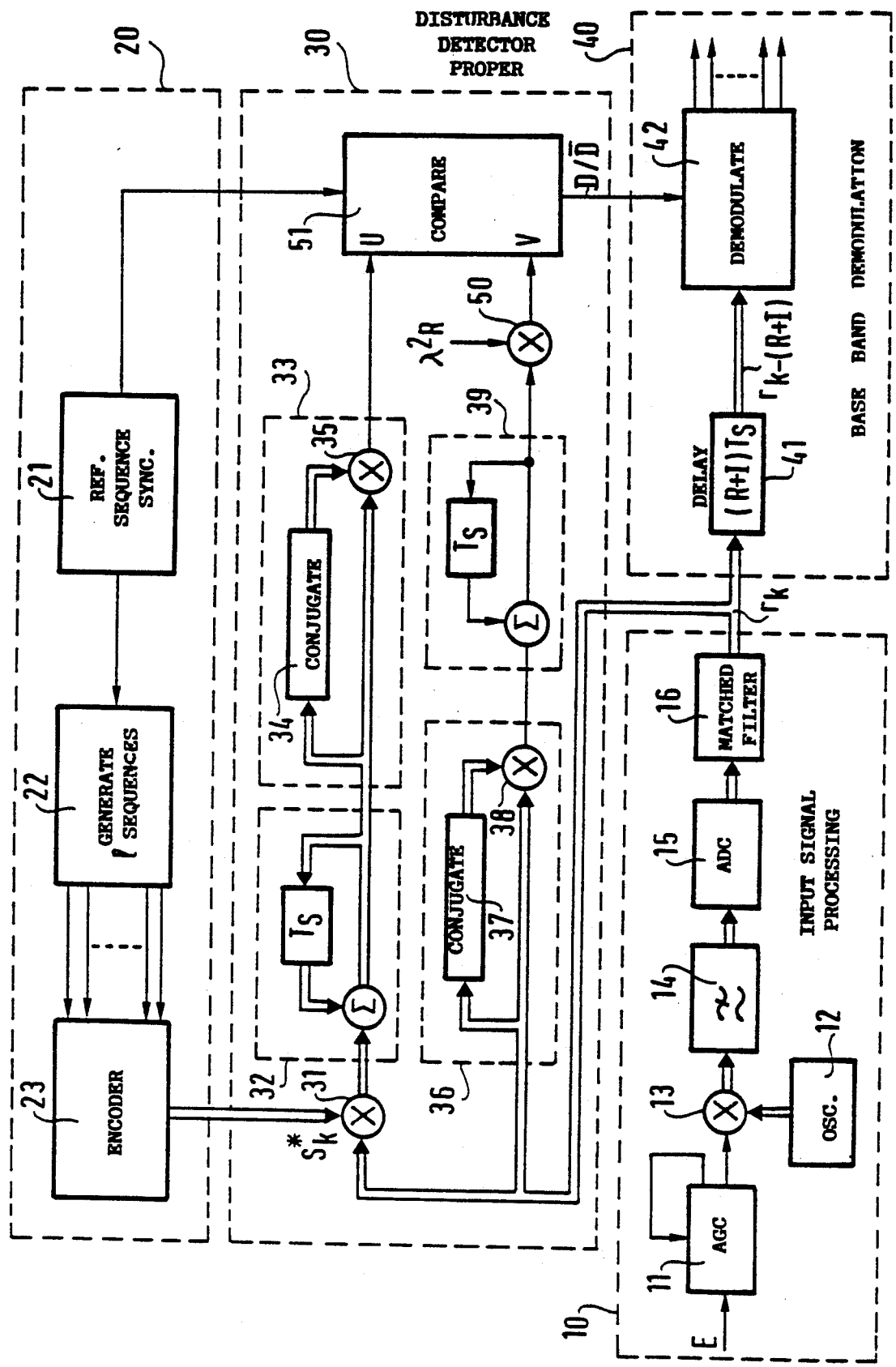

METHOD OF DETECTING A DISTURBING SIGNAL FOR A DIGITAL DATA DEMODULATOR, AND APPARATUS IMPLEMENTING SUCH A METHOD

The invention relates to a method of detecting a disturbing signal for a digital data demodulator, and to apparatus implementing such a method.

BACKGROUND OF THE INVENTION

In any transmission system based on digital modulation, transmission may be disturbed by disturbing signals as understood in a wide sense, i.e.:
either by other transmission systems; or
by deliberate jamming.
One prior art solution for detecting such disturbing signals as described in French patent No. 2 538 645 (application number 82 21 875, filed Dec. 28, 1982), consists in detecting the energy received outside the modulation band by a highpass filter having a cutoff frequency that is not less than the highest frequency of the modulation band. However, although such apparatus is effective for broadband disturbing signals, it functions poorly with narrow band disturbing signals. Under such circumstances, when a signal of adjacent frequency is detected, the received signal is taken to be disturbed even though it is not.

SUMMARY OF THE INVENTION

An object of the invention is to enable instantaneous detection of such disturbing signals.

To this end, the present invention provides a method of detecting a disturbing signal for demodulating digital data, wherein, on the modulated signal transposed into baseband, the disturbing signal is detected by periodically inserting reference symbols by means of a fixed guard time delay applied to the received signal prior to demodulation, and wherein said method includes:

a step of estimating the square of the modulus of the cross-correlation of the received signal and of the expected signal at a determined instant when the reference symbols are assumed to be present;

a step of estimating the square of the correlation of the received signal at the same instant, of multiplying by a coefficient which represents the square of the threshold for the estimated correlation coefficient, and of multiplying by the number of reference symbols used in a reference signal burst; and a step of comparing with each other the two quantities obtained simultaneously during the preceding two steps.

By delaying the received signal by a fixed guard time prior to demodulation, the method of the invention enables a component that does not belong to the emitted signal to be recognized instantaneously by appropriately processing the received signal prior to demodulation, thereby making it possible to detect the presence or the absence of a disturbing signal in order to take precautions against the effects thereof. It is then possible to trigger a procedure for "hardening" the synchronization systems of the demodulator, and possibly to switch on a rejector for rejecting the disturbing signal.

The invention also provides apparatus for implementing the method, the apparatus comprising:

a first circuit for shaping the input signal at intermediate frequency, for transposing this signal to baseband, and for sampling it;

a second circuit for synchronizing and shaping reference signals;

a third circuit for detecting the presence of disturbing signals; and a fourth circuit for baseband demodulation.

Advantageously, the second circuit comprises:
a circuit for synchronizing a reference sequence;
a generator for generating l binary sequences; and
an encoding circuit for encoding said sequences.

Advantageously, the second circuit has two paths which receive the modulated signal in baseband and which are applied to the two inputs of a comparator:

the first path comprising in succession:
a multiplier circuit which receives on a second input the output signals from the encoding circuit;
a complex summing and accumulating circuit which is reset to zero at the beginning of each block; and
a circuit for calculating the square of the modulus and including a conjugating component and a multiplying circuit;

the second path comprising:
a circuit for calculating the square of the modulus and including a conjugating component and a multiplier circuit;
a real summing and accumulator circuit; and
a multiplier circuit for multiplying by a constant.

Advantageously, the fourth circuit includes a delay circuit situated ahead of the demodulator.

The characteristics and advantages of the invention appear further from the following description given by way of non-limiting example and made with reference to the sole figure of the accompanying drawing which is a block diagram of apparatus of the invention.

The processing of the "received signal" $r_k$ is performed by conventional devices for frequency transposition, filtering, amplification, and analog-to-digital conversion.

$r_k$ represents a received baseband signal sampled at the sample time $T_s$ such that:

$$r_k = r(kT_s) = \sqrt{S} s_k + z_k$$

where
J is the interference power
S is the signal power
$s_k$ is the baseband representation of the symbol emitted at instant $kT_s$
$z_k$ represents the interference signal, with $E(|z|^2) = J$ and $E(|s|^2) = 1$.

The essential constraint for proper operation of such apparatus is the insertion of R reference symbols (known a priori at the receiver) once every I information symbols, thereby forming blocks of R+I symbols. Let the number of symbols possible for a given form of modulation be $L = 2^l$ (2PSK: l=1, 4PSK: l=2, 16QAM: l=4, etc. ... ). The R reference symbols may be identical in each block or they may be built up from l pseudo-random sequences of period $N = 2^m - 1$ such that $m >> R$.

Let $\rho$ be the modulus of the correlation coefficient between the received signal and the emitted signal:

$s^*$ designates the complex conjugate of s; the representation of digital modulation in baseband requires a representation that uses complex numbers;

E designates mathematical expectation.

When the received signal is equal to the emitted signal (no noise, no disturbance) $\rho = 1$, and if the received signal is completely decorrelated from the emitted signal $\rho=0$.

It may be observed that if $E(s)=0$, and by arbitrarily putting $E(|s|^2)=1$, the following is obtained:

$$\rho=|E(r\cdot s^*)|/\sqrt{(E(|r|^2))}$$

If the disturbing signal z is a signal such that $E(s)=0$ and $E(s.z)=0$, the following is obtained:

$$\rho=S/\sqrt{(S+J)}=(S/J)/\sqrt{(1+S/J)}$$

In the method of the invention, a ratio of signals to interference is set which determines the value $\lambda$ of the correlation coefficient below which it is taken that a disturbing signal is present and above which it is taken that such a signal is absent (or not destructive). For example, for $(S/J)dB=0$, $\lambda=1/\sqrt{2}$.

An estimator is then constructed for estimating the modulus of the modified correlation coefficient $\alpha$, which is calculated for each block of the reference symbols only, taking the beginning of each block as a time orgin.

$$\alpha=|\widehat{cov}(r\cdot s)|/\sqrt{(\hat{E}(|r|^2)\cdot var(s))}$$

In the presence of a high power narrow band jammer, the received signal is written:

$$r_k=\sqrt{S}s_k+\sqrt{J}\exp(j\theta_k)\approx\sqrt{J}\exp(j\theta_k)$$

with $J>>S$ and with $\theta_k$ usually being considered as a random variable uniformly distributed over $|-\pi,+\pi|$. If this random variable is observed over R symbols (typically about ten) it is reasonable to consider the variable $\theta_k$ as being constant, thus giving:

$$r_k=\sqrt{J}\exp(j\theta)$$

Since the estimate of the variance is zero over a short observation interval, the estimated variance of the received signal may be replaced by its estimated power. Since variance is limited by power, such a change merely reduces the estimate of the correlation coefficient, thereby reducing the possibility of non-detection.

BRIEF DESCRIPTION OF THE DRAWING

An embodiment of the present invention is described by way of example with reference to the sole figure of the accompanying drawing which is a block diagram of apparatus for implementing the method of the invention.

DETAILED DESCRIPTION

To simplify the description of the apparatus for implementing the method of the invention as shown in the figure, the simple case of the reference symbols in each block being identical is considered.

The possibility of using large-sized pseudo-random sequences for making identification of the reference sequence impossible means that it is possible to detect any type of disturbing signal.

The description of the simplified model makes it possible to obtain a good understanding of the apparatus, which can immediately be extrapolated to the more general case of using a pseudo-random sequence.

The unchanging sequence is chosen such that:

$$E(s)=\left[\sum_{k=0}^{R-1}s_k\right]/R$$

This requires the calculation to be performed on an even number R of symbols.

The calculations are performed on $\alpha^2$ to avoid square root calculations. Since division is to be avoided in a hard-wired or microprogrammed implementation, it is preferable to compare the quantities U and V where $\alpha^2=U/V$, with the developments of these quantities being obtained by assuming that:

$$\left[\sum_{k=0}^{R-1}r_k\right]/R=0$$

$$U=\left|\sum_{k=0}^{R-1}r_k s_k^*\right|^2$$

$$V=\lambda^2\sum_{k=0}^{R-1}\left(|s_k|^2-\left|\left[\sum_{k=0}^{R-1}s_k\right]/R\right|^2\right)\cdot\sum_{k=0}^{R-1}|r_k|^2\approx$$

$$\lambda^2 R\sum_{k=0}^{R-1}|r_k|^2$$

and it is decided that a disturbing signal is present if $V>U$, and absent if $V\leq U$.

The quantity U thus corresponds to the square of the cross-correlation coefficient between the reference symbols $s_k^*$ and the received signal $r_k$ at a given instant when the reference symbols are assumed to be present.

The quantity V thus corresponds to the square of the correlation of the received signal $r_k$ at the same instant multiplied by a coefficient $\lambda^2$ which represents the square of the threshold of the estimated correlation coefficient and which is multiplied by the number R of reference symbols used in a reference signal burst.

In the figure showing apparatus of the invention, the following convention is used:
real signals are represented by single lines; and
complex signals are represented by pairs of lines.

The modulation system has no special features other than it inserts R reference symbols (typically about ten) once every I information symbols (typically several tens), and is well known to the person skilled in the art.

As shown in the figure, the apparatus of the invention comprises:

a first circuit 10 for shaping the input signal E at intermediate frequency, for transposing the signal to baseband, and for sampling;

a second circuit 20 for synchronizing and shaping the reference signals;

a third circuit 30 for detecting the presence of disturbing signals, per se; and a fourth circuit 40 for performing baseband demodulation.

The third and fourth circuits receive the output signal from the first circuit.

The third circuit 30 which also receives the output sequences from the second circuit delivers a signal D/$\overline{D}$ indicating whether disturbing signals have been detected and applied to the fourth circuit 40 to have an effect, optionally, on demodulation (42).

The first circuit 10 comprises in succession:
an automated gain control circuit 11;

an analog multiplier circuit 13 for multiplying the in-phase path and the quadrature phase path by a frequency signal F from a local oscillator 12;

a lowpass filter 14 on each path;

an analog-to-digital converter 15 on each path; and a matched filter 16 which delivers a modulated signal transposed into baseband: $r_k$.

The second circuit 20 comprises in succession:

a circuit 21 for synchronizing a reference sequence;

a generator 22 for generating l binary sequences; and a circuit 23 for encoding said sequences.

The third circuit 30 comprises two paths both of which receive the baseband signal $r_k$ and both of which output to corresponding inputs of a comparator 51;

the first path comprises in succession:

a multiplier circuit 31 whose second input receives the output signals ($s_k^*$) from the encoding circuit 23;

a complex summing and accumulator circuit 32 which is reset to zero at the beginning of each block (where $T_S$ is a time delay equal to the symbol time); and a circuit 33 for calculating the square of the modulus of $\Sigma_k r_k s_k^*$ including a conjugating component and a multiplier circuit 35 which generates the quantity U at a reference instant in each block; and the second path comprises:

a circuit 36 for calculating the square of the modulus of $r_k$ and including a conjugating component 37 and a multiplier circuit 38;

a circuit for real summing and accumulating 39; and a circuit 50 for multiplying by a constant $\lambda^2 R$ and delivering the quantity V at the reference instant in each block.

The fourth circuit 40 includes a delay circuit 41 providing a delay equal to $(R+I)T_s$, and it is followed by a demodulator 42.

The first circuit 10 serves to obtain the signal $r_k$ from an analog signal at a higher frequency. The configuration shown in the figure for this circuit 10 is not unique, and such circuits are conventional. The local oscillator 12 is free running and generates an in-phase sinewave and a quadrature sinewave. After analog multiplication of the in-phase and quadrature paths in the multiplier 13, a lowpass filter 14 on each of the paths serves to remove double frequencies. The signal is then digitized using an analog-to-digital converter 15 placed on each path and at a rate which is greater than twice the symbol frequency. The matched filter 16 then delivers the signal $r_k$.

In the second circuit 20 which is a control circuit for the apparatus, the reference is synchronized at 21 by identifying the beginning and the end of a reference sequence. The circuit 21 generates a signal for enabling sequence generation by the binary sequence generator 22, and a signal for enabling comparison by the comparator 51 at the end of each reference sequence. In addition, resetting-to-zero commands are issued to the accumulator circuits 32 and 39 at the beginning of each block.

The generator 22 for generating l binary sequences reads through a sequence memory since the sequences are fixed. (In the event, not shown, of pseudo-random sequences being used, it would suffice merely to implement l loops of N shift registers.) The conjugate reference symbols $s_k^*$ are generated at 23 on the basis of these l sequences.

The third circuit 30 constitutes the core of the invention since it enables the quantities U and V to be calculated and then compared. $r_k$ is multiplied at 31 by $s_k^*$. Thereafter the successive products are added together in the complex summing accumulator 32. Finally the square of the modulus is calculated in the circuit 33 thus generating the quantity U at the single reference instant for each block. Simultaneously, the square of the modulus of $r_k$ is calculated at 36 and the successive moduluses are summed by the real summing and accumulator circuit 39. After multiplication (50) by the constant $\lambda^2 R$, the quantity V is obtained at the reference instant. The comparator 51 operates at the reference instant of each block to deliver a detection signal D indicating that a disturbing signal is present whenever $V>U$, and a non-detection signal $\overline{D}$ otherwise. This decision is stored until a decision is taken in the next block.

The fourth circuit 40 applies a delay 41 to the signal $r_k$ and it demodulates it at 42.

Since the detection calculation is performed once every $R+I$ symbols, it is probable each time a disturbing signal is detected, that said disturbing signal first appeared in the time interval between the preceding reference instant and the present reference instant, i.e. at an arbitrary point within the $R+I$ symbols that have passed. To make this possible, it is necessary to have a delay 41 of $R+I$ symbols prior to demodulation 42 so that detection can be considered as being instantaneous.

The characteristics of the method of the invention are thus as follows:

the presence of a disturbing signal in the modulated signal is detected without delay thus making it possible to use a procedure for hardening demodulation or for rejecting the disturbing signal before the disturbing signal has been able to disrupt the demodulator;

the absence of the disturbing signal is detected without delay providing the reference synchronization has not been spoilt by the disturbing signal; and the probability of nao-detection can be made arbitrarily small at the price of a loss of data rate (increasing R for fixed $R+I$) or at the price of a delay in demodulation (increasing R and I in the same ratio).

By combining the invention with observations of the automatic gain control voltage, it is possible to reduce the possibility of non-detection without loss of data rate.

The present invention has naturally been described and shown merely by way of preferred example, and its component parts could be replaced by equivalents without thereby going beyond the scope of the invention.

Detection can be made more reliable by using a "hysteresis" type comparator 51 that takes account of earlier decisions.

In the calculation of the estimate of the correlation coefficient, the variance of the received signal has been replaced by its power; however, the original form of this estimate could be conserved. When the variance of the received signal is zero or less than an infinitesimal threshold, it may be assumed to be a special case of the presence of a disturbing signal; in which case it is necessary to apply exception-handing treatment. In the implementation of the apparatus of the invention, this means that the threshold comparator should be replaced by a more sophisticated comparator enabling the presence of a disturbing signal to be detected when the coefficient is less than the predetermined threshold or when the variance of the signal is below a second threshold.

What is claimed is:

1. A method of detecting a disturbing signal for demodulating a modulated input signal (E) containing digital data, wherein, on the modulated input signal transposed into a baseband modulated signal ($r_k$), the disturbing signal is detected by periodically inserting reference symbols by means of a fixed guard time delay applied to the received signal prior to demodulation, and wherein said method further comprises:
- a first step of estimating the square of the modulus of the cross-correlation of a received signal and of an expected baseband modulated signal ($r_k$) at a determined instant when the reference symbols are assumed to be present;
- a second step of estimating the square of the correlation of the baseband modulated signal ($r_k$) at the same instant, of multiplying by a coefficient which represents the square of the threshold for the estimated correlation coefficient, and of multiplying by the number of reference symbols used in a reference signal burst; and
- a third step of comparing with each other the two quantities obtained simultaneously during the preceding two steps.

2. Apparatus for implementing a method of detecting a disturbing signal for demodulating a modulated input signal (E) containing digital data, wherein, on the modulated input signal transposed into a baseband modulated signal ($r_k$), the disturbing signal is detected by periodically inserting reference symbols by means of a fixed guard time delay applied to the received signal prior to demodulation, and wherein said method further comprises: a first step of estimating the square of the modulus of the cross-correlation of a received signal and of an expected baseband modulated signal ($r_k$) at a determined instant when the reference symbols are assumed to be present; a second step of estimating the square of the correlation of the baseband modulated signal ($r_k$) at the same instant, of multiplying by a coefficient which represents the square of the threshold for the estimated correlation coefficient, and of multiplying by the number of reference symbols used in a reference signal burst; and a third step of comparing with each other the two quantities obtained simultaneously during the preceding two steps;

said apparatus comprising:
- a first circuit (10) for shaping the input signal (E) at intermediate frequency, for transposing this signal to baseband, and for sampling it;
- a second circuit (20) for synchronizing and shaping reference signals ($S_K^*$);
- a third circuit (30) for detecting the presence of disturbing signals by implementing said first, second and third steps; and
- a fourth circuit (40) for baseband demodulation of the baseband modulated signal ($r_k$);

wherein said first circuit is coupled to said second and fourth circuits, said second circuit is coupled to said third circuit, and said third circuit is coupled to said fourth circuit.

3. Apparatus according to claim 2, wherein the second circuit comprises in succession:
- a circuit for synchronizing a reference sequence;
- a generator for generating 1 binary sequences; and
- an encoding circuit for encoding said sequences and outputting the reference signals ($S_K^*$).

4. Apparatus according to claim 3, wherein the sequences are pseudo-random in nature.

5. Apparatus according to claim 3, wherein the third circuit comprises a comparator, and two paths both of which receive the baseband modulated signal ($r_k$) and each of which feeds a respective input of the comparator;

the first path comprising in succession:
- a multiplier circuit which receives the modulated input signal ($r_k$) on a first input,
- a multiplier circuit which receives on a second input the reference signals ($S_k^*$) from the encoding circuit;
- a complex summing and accumulating circuit which is reset to zero at the beginning of each block of sequences; and
- a circuit for calculating the square of the modulus and including a conjugating component and a multiplying circuit;

the second path comprising:
- a circuit for calculating the square of the modulus and including a conjugating component and a multiplier circuit;
- a real summing and accumulator circuit; and
- a multiplier circuit for multiplying by a constant ($\lambda^2/R$).

6. Apparatus according to claim 5, wherein the comparator is a "hysteresis" comparator.

7. Apparatus according to claim 3, wherein the fourth circuit includes a delay circuit having an input connected to said first circuit, and an output connected to a demodulator.

* * * * *